(12) United States Patent
Hoffman et al.

(10) Patent No.: US 9,162,931 B1
(45) Date of Patent: Oct. 20, 2015

(54) TAILORED INTERFACES BETWEEN TWO DISSIMILAR NANO-MATERIALS AND METHOD OF MANUFACTURE

(75) Inventors: Wesley P. Hoffman, Palmdale, CA (US); Alexander N. Pechenik, Getzville, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 224 days.

(21) Appl. No.: 12/938,463

(22) Filed: Nov. 3, 2010

Related U.S. Application Data

(63) Continuation-in-part of application No. 12/152,128, filed on May 8, 2008, now abandoned.

(60) Provisional application No. 60/930,355, filed on May 9, 2007.

(51) Int. Cl.
*B32B 5/16* (2006.01)
*C04B 35/645* (2006.01)
*B82Y 30/00* (2011.01)

(52) U.S. Cl.
CPC .............. *C04B 35/645* (2013.01); *B32B 5/16* (2013.01); *B82Y 30/00* (2013.01)

(58) Field of Classification Search
USPC .................................. 264/102, 667, 674, 642
See application file for complete search history.

(56) References Cited

U.S. PATENT DOCUMENTS

| | | | | |
|---|---|---|---|---|
| 4,483,785 A * | 11/1984 | Johnson et al. | ............ | 252/520.2 |
| 4,615,735 A | 10/1986 | Ping | | |
| 4,627,892 A * | 12/1986 | Worrell et al. | ................ | 205/790 |
| 4,786,374 A * | 11/1988 | Worrell et al. | ................ | 205/775 |
| 4,915,605 A | 4/1990 | Chan et al. | | |
| 4,943,320 A | 7/1990 | Pechnik et al. | | |
| 5,204,055 A | 4/1993 | Sachs et al. | | |
| 5,217,822 A * | 6/1993 | Yoshida et al. | ................ | 429/489 |
| 5,234,641 A | 8/1993 | Rutt | | |
| 5,266,419 A * | 11/1993 | Yamada | ........................ | 429/535 |
| 5,387,299 A | 2/1995 | Singh et al. | | |
| 5,397,450 A * | 3/1995 | Sekhar et al. | ................ | 204/243.1 |
| 5,453,330 A * | 9/1995 | Kawasaki et al. | ............ | 429/481 |
| 5,509,978 A | 4/1996 | Masumoto et al. | | |
| 5,561,829 A | 10/1996 | Sawtell et al. | | |
| 5,687,679 A | 11/1997 | Mullin et al. | | |
| 5,779,833 A | 7/1998 | Cawley et al. | | |
| 5,788,738 A | 8/1998 | Pirzada et al. | | |
| 5,984,997 A | 11/1999 | Bickmore et al. | | |
| 5,997,800 A | 12/1999 | Wimberger Friedl et al. | | |
| 6,020,419 A | 2/2000 | Bock et al. | | |
| 6,048,577 A | 4/2000 | Garg | | |
| 6,203,768 B1 | 3/2001 | McCormick et al. | | |
| 6,207,038 B1 * | 3/2001 | Steil et al. | ..................... | 205/634 |
| 6,312,643 B1 | 11/2001 | Upadhya et al. | | |
| 6,410,160 B1 * | 6/2002 | Landin et al. | ................ | 428/613 |
| 6,447,712 B1 | 9/2002 | Dogan et al. | | |
| 6,656,336 B2 * | 12/2003 | Mukundan et al. | ............ | 204/424 |
| 6,682,598 B1 | 1/2004 | Steinmueller et al. | | |
| 6,709,628 B2 * | 3/2004 | Kleinlogel et al. | ............ | 264/661 |
| 6,787,080 B1 * | 9/2004 | Lange et al. | ...................... | 264/86 |
| 6,800,158 B2 * | 10/2004 | Polikarpus et al. | ........ | 156/89.12 |
| 6,811,741 B2 | 11/2004 | Pham et al. | | |
| 6,861,155 B2 | 3/2005 | Bawendi et al. | | |
| 6,866,957 B1 * | 3/2005 | Bagger et al. | .................. | 429/495 |
| 6,908,568 B2 | 6/2005 | Masuzawa et al. | | |
| 6,930,059 B2 | 8/2005 | Conley et al. | | |
| 7,029,777 B2 * | 4/2006 | Mardilovich et al. | ......... | 429/488 |
| 7,128,995 B2 * | 10/2006 | Higuchi et al. | ................ | 429/535 |
| 7,131,174 B2 | 11/2006 | Kobayashi et al. | | |
| 7,186,368 B2 * | 3/2007 | Simwonis et al. | ............ | 264/618 |
| 7,214,333 B2 * | 5/2007 | Mukundan et al. | ............ | 264/118 |
| 7,438,837 B2 * | 10/2008 | Hatano et al. | ............... | 252/520.2 |
| 7,527,761 B2 * | 5/2009 | Swartzlander et al. | ........ | 264/618 |
| 7,595,127 B2 * | 9/2009 | Seabaugh et al. | ............. | 429/486 |
| 7,713,592 B2 | 5/2010 | Nguyen et al. | | |
| 7,833,469 B2 * | 11/2010 | Swartzlander et al. | ....... | 264/618 |
| 7,947,212 B2 * | 5/2011 | Hilton Steele et al. | ....... | 264/618 |
| 8,197,885 B2 * | 6/2012 | Honecker et al. | ................ | 427/74 |
| 2002/0108854 A1 * | 8/2002 | Labarge et al. | ................ | 204/424 |
| 2002/0146611 A1 * | 10/2002 | Kawasaki et al. | ................ | 429/31 |
| 2002/0185376 A1 * | 12/2002 | Mukundan et al. | ............ | 204/424 |
| 2003/0027027 A1 * | 2/2003 | Cutler et al. | ..................... | 429/33 |
| 2003/0027033 A1 * | 2/2003 | Seabaugh et al. | ............... | 429/40 |
| 2003/0090027 A1 * | 5/2003 | Smirnova et al. | ......... | 264/177.11 |
| 2003/0148160 A1 * | 8/2003 | Song et al. | ....................... | 429/31 |
| 2003/0165726 A1 * | 9/2003 | Robert et al. | .................... | 429/33 |
| 2003/0224234 A1 * | 12/2003 | Steele et al. | .................... | 429/30 |
| 2004/0033886 A1 * | 2/2004 | Simwonis et al. | ............ | 502/101 |
| 2004/0104519 A1 * | 6/2004 | Chen et al. | .................... | 264/618 |
| 2004/0202919 A1 * | 10/2004 | Mardilovich et al. | ........... | 429/44 |
| 2004/0265483 A1 * | 12/2004 | Meyer et al. | .................. | 427/115 |

(Continued)

OTHER PUBLICATIONS

Bargeron et al., "Oxidation of hafnium carbide in the temperature range 1400 to 2060 C," J. Amer. Ceram. Soc., vol. 76 (1993) 1040-1046.

(Continued)

*Primary Examiner* — Yogendra Gupta
*Assistant Examiner* — Kimberly A Stewart
(74) *Attorney, Agent, or Firm* — AFMCLO/JAZ; Chastity Whitaker

(57) ABSTRACT

Provided are methods to fabricate bulk quantities at relatively low-cost of isotropic homogeneous nanostructured materials with high interfacial area whose properties are controlled and optimized by tailored interfaces between discrete dissimilar materials. In a preferred embodiment, the material is formed by uniformly and intimately mixing nanoparticles of different composition and then compacting and consolidating them to near theoretical density by a process that minimizes grain growth and controls the structure of the interfacial film-like region. One preferred application of these materials is a fast ion conducting material that can be used as a solid electrolyte in gas electrolyzers, electrochemical pumps, gas sensors, catalytic reactors, and most importantly in fuel cells.

21 Claims, No Drawings

(56) References Cited

U.S. PATENT DOCUMENTS

| | | | |
|---|---|---|---|
| 2005/0082726 A1 | 4/2005 | Hilmas et al. | |
| 2005/0095495 A1* | 5/2005 | Yamada et al. | 429/44 |
| 2005/0095497 A1* | 5/2005 | Yamada et al. | 429/45 |
| 2005/0275143 A1 | 12/2005 | Toth | |
| 2006/0049540 A1 | 3/2006 | Hui et al. | |
| 2006/0118158 A1* | 6/2006 | Zhang et al. | 136/205 |
| 2006/0125157 A1* | 6/2006 | Swartzlander et al. | 264/618 |
| 2007/0026285 A1* | 2/2007 | Wang et al. | 429/33 |
| 2007/0077476 A1* | 4/2007 | Lee et al. | 429/30 |
| 2007/0117006 A1* | 5/2007 | Zhan et al. | 429/45 |
| 2007/0176332 A1* | 8/2007 | Swartzlander et al. | 264/618 |
| 2007/0179040 A1 | 8/2007 | Li et al. | |
| 2007/0273070 A1 | 11/2007 | Badding et al. | |
| 2009/0188789 A1* | 7/2009 | Honecker et al. | 204/298.13 |
| 2010/0028757 A1* | 2/2010 | Fu et al. | 429/40 |
| 2010/0054981 A1* | 3/2010 | Liu | 419/19 |
| 2010/0126807 A1* | 5/2010 | Liao et al. | 187/254 |
| 2010/0159356 A1* | 6/2010 | Mahoney | 429/495 |
| 2010/0167170 A1* | 7/2010 | Narendar et al. | 429/495 |
| 2010/0200427 A1* | 8/2010 | Koike et al. | 205/775 |
| 2010/0292522 A1* | 11/2010 | Chun et al. | 585/648 |
| 2011/0236743 A1* | 9/2011 | Kumar et al. | 429/144 |
| 2012/0009507 A1* | 1/2012 | Wood et al. | 429/535 |
| 2012/0049132 A1* | 3/2012 | Marlin et al. | 252/513 |
| 2012/0094214 A1* | 4/2012 | Zahid et al. | 429/496 |
| 2012/0141916 A1* | 6/2012 | Robert et al. | 429/495 |

OTHER PUBLICATIONS

Jia et al, "Abrasion resistance of nanostructured and conventional cemented carbides," Wear, vol. 200 (1996) 206-214.

Wang et al., "Abrasive wear characteristics of plasma sprayed nanostructure alumina/titania coatings," Wear, vol. 237 (2000) 176-185.

Sundararajan et al., "High temperature corrosion of nanoceria coated 9Cr-1Mo ferritic steel in air and steam," Surface and Coatings Technology, vol. 201 (2006) 2124-2130.

Costescu et al., "Ultra-low thermal conductivity in W/Al2O3 nanolaminates," Science, vol. 303 (2004) 989-990.

United States Patent and Trademark Office, Non-Final Office Action in U.S. Appl. No. 12/938,462, mailed Jul. 16, 2013, 22 pages.

H. I. Kim et al., "Age-hardening associated with grain boundary precipitation in a commercial dental gold alloy," J. Oral Rehab., vol. 26 (1999) 215-222.

United States Patent and Trademark Office, Advisory Action in U.S. Appl. No. 12/152,128, mailed Jun. 5, 2012, 2 pages total.

United States Patent and Trademark Office, Final Office Action in U.S. Appl. No. 12/152,128, mailed Mar. 20, 2012, 24 pages total.

United States Patent and Trademark Office, Non-Final Office Action in U.S. Appl. No. 12/152,128, mailed May 19, 2011, 14 pages total.

United States Patent and Trademark Office, Non-Final Office Action in U.S. Appl. No. 12/728,293, mailed Apr. 11, 2012, 9 pages total.

United States Patent and Trademark Office, Non-Final Office Action in U.S. Appl. No. 12/980,831, mailed Feb. 22, 2013, 11 pages total.

T. G. Nieh et al., "Dynamic compaction of aluminum nanocrystals," Acta mater., vol. 44 (1996) 3781-3788.

L. Armelao et al., "Zirconium and hafnium oxoclusters as molecular building blocks for highly dispersed ZrO2 or HfO2 nanoparticles in silica thin films," J. Mater. Chem., vol. 15 (2005) 1838-1848.

R. C. O'Handley et al., "Phenomenology of giant magnetic-field-induced strain in ferromagnetic shape-memory materials," J. App. Phys., vol. 87 (2000) 4712-4717.

S. Zhang et al., "Coercivity induced by random field at ferromagnetic and antiferromagnetic interfaces," J. Magnetism Magnetic Mater., Vol. 198-199 (1999) 468-470.

Z. Q. Jin et al., "Shock compaction of bulk nanocomposite magnetic materials," Mater. Sci. Forum, vol. 465-466 (2004) 93-100.

A. Gozar et al., "High-temperature interface superconductivity between metallic and insulating copper oxides," Nature Lett., vol. 455 (2008) 782-785.

A. E. Berkowitz et al., "Establishing exchange bias below TN with polycrystalline ni0.52Co0.48O/Co bilayers," Phys. Rev. B., vol. 72 (2005) 134428, 9 pages total.

J. Garcia-Barriocanal et al., "Colossal ionic conductivity at interfaces of epitaxial ZrO2:Y2O3/SrTiO3 heterostructures," Science, vol. 321 (2008) 676-680.

A. S. Utada et al., "Dripping, jetting, drops, and wetting: the magic of microfluids," MRS Bull., vol. 32 (2007) 702-708.

D. W. Matson et al., "Production of fine powders by the rapid expansion of supercritical fluid solutions (retroactive coverage)," Adv. Ceramics., vol. 21 (1986) 109-120.

M. Suzuki et al., "Synthesis of silicon carbide-silicon nitride composite ultrafine particles using a carbon dioxide laser," J. Am. Ceramic Soc., vol. 76 (1993) 1195-1200.

Chen et al., "Novel equipment for the study of compaction of fine powders," J. Amer. Ceramic Soc., vol. 77 (1994) 1005-1010.

\* cited by examiner

TAILORED INTERFACES BETWEEN TWO DISSIMILAR NANO-MATERIALS AND METHOD OF MANUFACTURE

CROSS REFERENCE TO RELATED APPLICATIONS

This application is a continuation-in-part of U.S. patent application Ser. No. 12/152,128 filed on May 8, 2008 now abandoned, which claims the benefit of U.S. Provisional Application Ser. No. 60/930,355 filed on May 9, 2007.

RIGHTS OF THE GOVERNMENT

The invention described herein may be manufactured and used by or for the Government of the United States for all governmental purposes without the payment of any royalty.

BACKGROUND OF THE INVENTION

The approach to fabricate "Nanoscale Environmental Barrier Materials" by employing precisely-coated nanophase particles that have been consolidated to near theoretical density offers unprecedented opportunities in fabricating bulk quantities of materials that currently exist only as small research samples (because of prohibitively expensive fabrication techniques. Since the properties of these materials are controlled to a great extent by interfaces, these materials are called "Interface-Controlled Nano-Materials."

There are many, recent uses of nanophase particles in which either the reduction in size of particles to the nanometer scale (typically <100 nm) or dispersement of the particles as a second solid phase can be used to produce materials with unique properties. Nanophase particles consolidated into monolithic materials exhibit greater hardness and strength in metals and cermets due to reduced grain size and slip distance, respectively. Nanosized grains in metals provide high ductility while enhancing other properties, which is not possible with normal grain-size metals. In ceramics, greater hardness and toughness result from reduced defect size and enhanced grain boundary stress relaxation, even at ambient temperature. With nanosize grains diffusivity can be greatly increased due to the larger volume of grain boundaries, while thermal conductivity is reduced because of enhanced phonon scattering at grain boundaries and other nanoscale features.

The approach of creating highly desirable properties in materials by developing specific micro- and nano-structures is not new. In fact it has been used for thousands of years. Generally speaking, techniques of materials processing (such as precipitation hardening of aluminum and copper alloys, carbonization and heat treatment of steel, inducing color to glass, and making porcelain) are all based on developing unique micro- and nano-structures in the materials. In fact, it can be said that the whole field of Materials Science is exactly that—searching for the right nano- and microstructure and the methods of arriving at it to yield the desired properties.

The approach utilizing nanosize particles to yield bulk materials, or coatings, is relatively new. Consolidation of fine powders constituted of nanosize particles is becoming a well-established industrial technology. There are numerous methods and techniques for fabricating nanosize particles, protecting and modifying their surfaces, and consolidating them via colloidal methods, cold pressing, sintering, or hot pressing. In some applications, despite their increased cost, the use of nanosize particles brings about such unique and desirable properties to the produced materials that whole new industries have been established. One of the main advantages of using nanosize particle based powders as starting materials versus using conventional microscopic-based powders lies in the remarkable reactivity of nanosize particles.

Nanosize particles have also been coated with a nanoscale coating of a different composition in numerous existing applications. In all these applications, the vast majority of which are medical, the particles maintain nano-dimensions and remain discrete. Metallic or ceramic nanosize particles, for example, can be coated with biochemicals, such as proteins and peptides for binding to and destroying particular cells with medicine, heat, or by cutting off blood supply. Many of these nanosize particles are paramagnetic so that they can be imaged with increased contrast by MRI and can be targeted to a desired location by a magnetic field that is external to the body. These paramagnetic nanosize particles are first coated with gold or a bio-compatible polymer and then coated with a medicine or vaccine. A magnetic field is employed to direct these nanosize particles to the area of disease so that the medicine coating may be released to the precise location where it is needed. This allows the use of very effective drugs that are otherwise too toxic to be delivered. Alternatively, this site specific feature can also be used to direct hyper-thermal treatment to a tumor. The radio frequency energy source for this thermal therapeutic treatment is external to the body. Additionally, layered composite coatings of both biodegradable and bioactive compounds provide the medical community with great flexibility and precise control over drug design and release. When nanosize particles of bio-active crystals or materials are coated with one or more polymer layers, they can be tailored for slow, quick, specific, or heat-release of drugs.

Other applications of nanoscale coatings of discrete nanoparticles include coatings to keep nanoparticles from fusing together at contact, to inhibit particle growth (see, e.g., U.S. Pat. No. 6,048,577), to inhibit oxidation of energetic materials, to inhibit photocatalytic reaction of the particle, and coatings to alter the optical properties of the nanoparticles, such as photoluminescence (see, e.g., U.S. Pat. No. 6,861,155). It is interesting to note that in all of these existing applications of coated nanoparticles, which also includes cosmetic and sunscreen additives, the particles remain discrete and the composition of the particle is inorganic, while the composition of the exterior coating is organic.

Utilizing micron-sized particles, the Vapor Phase Redistribution (VPR) may be used for fabricating novel ceramic/metal composites from ceramic/metal systems that are not characterized by the favorable interfacial wetting phenomena, such as that utilized so successfully in the manufacturing of WC/Co materials (see, e.g., U.S. Pat. No. 4,943,320). The VPR techniques consist of intimately mixing metal and ceramic powders under a controlled atmosphere and placing the resulting mixture under vacuum or a controlled atmosphere at elevated temperatures to allow for the metal phase to deposit on the surface of ceramic particles via a vapor deposition process. As a result of this procedure, most of the ceramic particles become coated on the surface with a thin layer of metal. Afterwards, the resultant mixture is rapidly compressed to facilitate binding of the metal-capped particles and to produce a dense consolidated part. Although the VPR procedure shares some similarities in its general approach to the instant invention, there are deep and important differences between the two approaches that make the instant approach unique and different. For example, and in contrast to the current teaching, which requires totally and evenly coated nanoscale particles for its success, the VPR approach is not designed to work with nanosize particles and does not yield good uniform coating for each particle.

SUMMARY OF THE INVENTION

The instant invention describes precisely-coated nanophase particles that have been consolidated to near theoretical density for use in a variety of applications. Since the properties of these materials are controlled, to a great extent, by interfaces, these materials are called "Interface-Controlled Nano-Materials." This invention offers unprecedented opportunities in fabricating bulk quantities of materials that currently exist only as small research samples because of the prohibitively expensive fabrication techniques.

One aspect of the uniqueness of this approach is in its capability of manufacturing large, bulk, quantities of materials at relatively low cost that currently are fabricated in small quantities by very expensive techniques. Another aspect of the uniqueness of this approach is in its ability to design, control, and optimize composition and properties of the interfaces rather than the bulk of the nanophase grains. The materials produced by this invention are truly Interface-Controlled Materials, or ICMs. This invention focuses on the engineering and science of interfaces, which sets it apart from most previous research on nanocrystalline materials and nanocrystals, in particular, which have always been focused on the properties of the nanograins themselves. Depending on the application, these interfaces may be between nanophase grains, between the nanophase particle and a coating on the particle, between coating layers on the particles, or between coated nanophase particles.

In essence, by combining: (1) proper choice of nano-particle as well as coating composition; (2) precise engineering and preparation of the starting nanosize powders; (3) complete uniform coating of the nano-particles with at least one coating; (4) nano-assembly or rate-controlled compaction to achieve ordered, or just dense, greenware; and (5) elevated temperature consolidation, it is possible to fabricate, in bulk quantities, materials that before were only produced via electro- and electroless deposition, physical vapor deposition, laser ablation, magnetron sputtering, and similar prohibitively expensive techniques. The capability of the above approach to fabricate semi-coherent and, possibly, nearly coherent interfaces offers unprecedented opportunities in such areas as industrial manufacturing of nanocrystals, mesoporous nanostructures, hierarchically-ordered nanostructures and nano-laminates for applications in electronics, optics, magnetics, energy devices, fuel cells and many more high-technology areas.

It is well known in material science that the properties of materials are tailored, not just by composition, but also by the means and sequence used to combine the constituents of the material or place the constituents. In the instant invention, the increased effectiveness of the material for a specific application is not due to using chemical compounds different from those used in the prior art. Rather, the increased effectiveness is due to how the various chemical compounds are placed in intimate contact with one another and especially in forming the interface.

When employing nano-structured materials in any applications, there are two issues that must be addressed to make the application effective. First, a sufficiently high density must be achieved in order to realize the predicted beneficial properties. Second, the issue of thermal stability of the produced structures must be addressed, since any material that consists of nanoscale phases or consolidated nanosize particles contains very high energy associated with the enhanced area of interfaces. The approach outlined in this invention addresses both of these issues. This invention describes not only a method of manufacturing unique nano-structured materials that cannot be fabricated in other ways, but also teaches a novel approach for stabilizing these nanostructures, even at extremely high temperatures, via the judicious selection of component materials based on known phase diagrams. Moreover, this invention enables the achieving of unique gains in high-temperature oxidation and reaction stability by taking advantage of the stabilizing forces of thermodynamic equilibrium that are operative on the nanometer scale but lay entirely dormant in materials whose structure is comprised of at least micron-sized features. That is, it is necessary to maintain thermodynamic equilibrium between the particle and the coating. It is fortuitous that the force driving the system to equilibrium increases as the dimensions decrease. That is, by utilizing coated-nanoparticles, the number of interfaces in the material are greatly increased, which, in turn, increases the entropy of the system. The stability is increased by decreasing Gibbs free energy (AH-TAS). The uniqueness and power of this approach lies in activating the true capabilities of the nanoscopic structuring made possible by the unique processing approach outlined below.

In the present invention, nanophase particles ranging from 1-1000 nm (preferably, spherical and from 1-100 nm) in their maximum dimension are totally and evenly coated with at least one coating of nanoscale thickness (i.e., 1 nm to 100 nm and, preferably, from 1 nm to 20 nm) comprised of at least one material whose composition is different from the composition of the particle. It is imperative that every particle be precisely and uniformly coated or the coating will not be effective for its intended use. This requires that the coating thickness on the surface of each particle and among the particles not vary by more than 50%, and preferably by less than 1%. In one embodiment, particles of essentially the same diameter with well-defined even coating thickness are employed. This will maximize homogeneity, which is desirable. In another embodiment, there is at least a bi-modal distribution, or preferably a tri-modal distribution, of coated particles to maximize the packing efficiency and thus the density of the product in addition to inhibiting grain growth.

The particles can be coated in a sequential process after formation. This can be accomplished in a number of ways. That is, either the particle is formed and then coated in a separate process after it is formed, or the coating is placed on the surface of the particle subsequently to creating the particle in the same process, that is, using a capping process, a microfluidic jetting process as described in UTADA et al., in "Dripping, Jetting, Drops, and Wetting: The Magic of Microfluidics," MRS Bulletin, Vol. 32 (2007) 702-708, or other processes to make core-shell particles. Alternatively, the outer surface region of the previously produced particle can be converted to a material different than the particle, thereby forming a coating on the particle. In addition, the particle and the coating can be formed by a phase separation technique. These coated nanoparticles are then consolidated by a process that minimizes grain growth up to near theoretical density (i.e., greater than 95%, and preferably greater than 99%, of theoretical density). This consolidation places the particle and coating materials in intimate contact with one another and produces a very homogeneous material on the nanometer scale, which results in improved thermal shock resistance.

This homogeneous material represents the ultimate in dispersion since coated nanoparticles with a mono-modal size distribution can essentially be equidistant from one another. The result of the consolidation is a material with an extremely high interfacial area between the discrete materials and with the interfacial area being almost continuous. The intimate contact of the materials allows for rapid interaction of the materials and results in a unique material that is able to take advantage of any synergism of the different materials comprising the coated nanoparticle. Such advantages may include self-healing or solid solutions. In addition, the small size of the consolidated coated nanoparticles produces a material with very small grain size, which limits grain boundary movement and inhibits diffusion of fluids as well as thermal transport.

DETAILED DESCRIPTION OF THE INVENTION

This invention describes a unique class of nanoscale materials that have application in such diverse fields as fast ion conductors, magnetostrictive materials, semiconductors, hydrogen storage materials, superconductors, and environmental barrier materials. It also describes a low-cost method to fabricate large bulk quantities of these materials. In the description of this invention, the terms nano, nanoscopic, nanophase, nanoscale, nanosize, nano-grain, and nanostructured will be used interchangeably to describe the materials of this invention.

One of the goals of this invention is to produce precisely and uniformly-coated nanophase particles that have been consolidated to near theoretical density for use in a variety of applications. Another goal is to provide the capability of manufacturing large, bulk, quantities of these materials at relatively low-cost that currently are fabricated in small quantities by very expensive techniques, such as, PVD, laser ablation, magnetron sputtering, electro-deposition, and electroless deposition. An aspect of the uniqueness of this approach is in its ability to design, control, and optimize composition and properties of the interfaces, rather than the bulk of the nanophase grains. The materials produced by this invention are truly Interface-Controlled Materials, or ICMs. This invention focuses on the engineering and science of interfaces, which sets it apart from most previous research on nanocrystalline materials and nano-crystals, in particular, which have been always focused on the properties of the nanoparticles themselves. Depending on the application, these interfaces may be between nanophase grains, between the nanophase particle and a coating on the particle, between coating layers, or between coated nanophase particles.

The instant invention takes a totally different approach to forming materials for the variety of applications described below. Thus, instead of utilizing macroscopic layers of materials having a thickness ranging from microns to millimeters and comprised of grains ranging in size from tens to hundreds of microns, all dimensions are decreased to the nanometer scale. That is, the materials of this invention comprise nanometer scale particles, having a nearly spherical shape, with a maximum dimension ranging from 1 nm to 1000 nm, preferably from 1 nm to 100 nm or from 1 nm to 20 nm. These particles are precisely and uniformly coated with at least one layer of a material whose composition is different from the particle and that has a thickness on the nanometer scale (i.e., 1 nm to 100 nm, and preferably from 1 nm to 20 nm). To be precisely and uniformly coated requires that the coating thickness on the surface of each particle and among the particles not vary by more than 50%, and preferably by less than 1%.

Although the nanoparticles are usually coated with only one layer of nanometer thickness, there is no limit to the number of layers with which the nanoparticles can be coated. In contrast to a single layer coating, whose composition must be of different composition than the composition of the nanoparticle, it should be stated that if there is more than one coating layer, the composition of any subsequent layer can be the same as that of the particle. The only composition requirement for the layers beyond the first layer is that the composition of adjacent layers be different. Coating with numerous sequential layers produces onion-like particles that are essentially interfaces wrapped around interfaces. That is, the material consists essentially only of continuous, film-like interfacial regions in contact with one another. The only bulk material would be the nanoparticles that have been coated to produce nanoparticles many times the size of the original particle. Thus, this onion-like material has a smaller percentage of bulk material and a larger percentage of interfacial film-like regions.

To produce the coated particles, the particles are either formed and then coated in a separate process after they are formed or the coating is placed on the surface of the particle subsequently to creating the particle in the same process using, for example, a capping process, a microfluidic jetting process (as described in UTADA, supra), or other processes known in the art to make core-shell particles.

As stated, after formation, the particles can be coated in a separate sequential process by any technique, such as chemical vapor deposition (CVD), fluidized bed CVD, electrophoresis, atomic layer deposition (ALD), chemical fluid deposition, pulsed laser deposition, or sol gel that does not adversely affect the composition of the particle. Alternatively, the outer surface region of the particle can be converted, for example, by oxidation, carburization, boridization, nitridation, etc., to a different material forming essentially an even homogeneous coating on the particle.

Another embodiment of the present invention includes a new method to encapsulate nanoparticles with a coating that is not described in the prior art and that entails the use of phase separation to form the particle and the coating. In a manner similar to that employed to fabricate precipitation-strengthened materials for hundreds of years, the novel concept outlined below offers a method for making coated nanostructured materials via phase separation.

In the precipitation-strengthening of materials, limited solubility properties of some compounds are utilized to develop unique nanoscale precipitates that pin dislocations and thus increase the strength and thermal stability of alloys. In a similar manner, the limited solubility properties of some compounds can be employed to encapsulate or coat nanoparticles simply by heating metastable nanoparticles.

In this process, the metastable nanoscale particles are fabricated in a quasi-equilibrium state via conventional state-of-the-art gas-phase or liquid-phase processes. Synthesis of non-equilibrium nanosize particles is a well-established technology. Laser-driven gas-phase reactions, mechanical alloying, rapid expansion of supercritical solutions, rapid quenching, and splat cooling are known to produce amorphous particles having a composition that is a random atomic mixture of the ingredients. See, for example, D. W. MATSON et al., "Production of fine powders by the rapid expansion of supercritical fluid solutions (retroactive coverage)," Adv. Ceramics., Vol. 21 (1986) 109-120 and M. SUZUKI et al., "Synthesis of silicon carbide-silicon nitride composite ultrafine particles using a carbon dioxide laser," J. Am. Ceramic Soc., Vol. 76 (1993) 1195-1200. Virtually any composition of metal and/or ceramic can be prepared in an amorphous state, regardless of the phase equilibrium diagrams.

Each nanoscale particle formed consists of at least two, intimately-mixed, immiscible materials or phases. The percentage of each material in the mixture is chosen so that the dimensions of the nanoscale particle and the thickness of the coating on the particle are in the desired proportions. The two phases remain in a non-equilibrium frozen atomic arrangement by employing techniques, such as very rapid cooling, quenching, mechanical deformation, vapor condensation, or explosive synthesis. After fabrication, the non-equilibrium nanoscale particles can be amorphous, glassy, or crystalline with the two phases intimately mixed.

After the metastable particles are formed, the next step is to fabricate a dense compact from these non-equilibrium particles. Because of the highly disturbed atomic arrangement, the metastable particles exhibit a very high degree of plasticity and can be easily processed to near full density at relatively low temperatures (i.e., less than 0.5 of the melting temperature) using processes such as dynamic compaction, explosive compaction, or other adiabatic approaches and via a diffusion-less, plastic deformation process. It should be noted that other traditional means can also be employed to consolidate these nanoscale particles to near theoretical density, which is the density of the material without pores. This density is conventionally calculated using the unit cell volume, the material's chemical formula, and the number of formula units per unit cell.

After a dense compact of non-equilibrium particles is produced, it is then subjected to a carefully-designed heat treatment to allow phase separation to occur in accordance with the phase diagram of the constituents, which must show at least a range of limited solid solubility or, preferably, complete immiscibility. The two or more immiscible phases will now have the energy required to comply with the equilibrium phase diagram via the diffusional process. One of the phases will move towards the grain boundary region and essentially form a film or coating around the grain. In metals such phenomena have been observed and the separation frequently occurs at the grain boundaries, such as provided in H. I. KIM et al., "Age-hardening associated with grain boundary precipitation in a commercial dental gold alloy," J. Oral Rehab., Vol. 26 (1999) 215-222. To date, no nanophase materials as described in the instant invention have been produced. The final result of the phase separation process is a material formed from coated or encapsulated stable nanoparticles that have been consolidated.

The optimum particle size, particle composition, particle size distribution, coating composition, and coating thickness for a particular material system is determined for each application on the basis of chemistry, thermodynamics, and finite element analysis. The composition of the particle and the at least one coating can comprise polymers, ceramics, metals, or cermets. Particles prepared by means known in the art can be coated by means known in the prior art and then consolidated by a process that induces plastic deformation while minimizing both grain growth and damage to the coated particle. It is important to note that the grain growth of nanoscale particles decreases desirable properties and thus every effort should be made to minimize or eliminate this phenomenon. An additional advantage of the instant invention is that the coating on each particle, itself, inhibits grain growth.

This consolidation utilizes a process, such as pressing, spraying, rapid sintering, or annealing, to produce a dense homogeneous material. These methods can also be aided by a magnetic field or an electric field in order to decrease time and temperature for the consolidation process and thus further reduce grain growth. Alternatively, or additionally, microwave heating can be used to accomplish the goal of obtaining near theoretical density without appreciable grain growth. Each of these techniques is able to essentially fully consolidate the material and to produce an incoherent interface or a semi-coherent interface. However, the sintering process will cause some grain growth and the phases with either separate or dissolve into the other. Thus, to produce the coherent interfaces required for some applications described below, atomic templating may be required.

Atomic templating processes utilizing magnetron sputtering are routinely employed to create materials having interfaces that are atomically perfect. These interfaces yield all kinds of colossal properties, including super Young's modulus, colossal magnetic properties, and colossal oxygen conduction. These properties do not appear in nature because the materials are thermodynamically unstable and require sophisticated and complicated processing to produce.

As stated above, magnetron sputtering can produce research-size samples, but the process requires expensive equipment and high vacuum. Thus, this technique is not able to produce industrial-size bulk samples at low cost. A new approach, such as atomic templating via cold consolidation (ATCC) is required to produce large bulk samples with atomically perfect interfaces at a small fraction of the cost. The ATCC technique consists of cold, elevated temperature, or explosive compaction of nano-coated nanoparticle at high-pressure (greater than 0.3 GPa, and preferably greater than 1.0 GPa), which leads to densification via plastic deformation of the particles under pressure rather than via the diffusion-assisted flow mechanism that would require higher temperatures. Thus, the elevated temperature must be high enough to enhance plastic deformation but not high enough for sintering. A subsequent anneal, at temperatures high enough to lead to atomic re-arrangement yet low enough not to cause grain growth, finishes the procedure. The result is a fully-dense bulk material consisting of nanosize grains with atomically perfect coherent interfaces. Particle growth is eliminated so that growing particles do not disrupt the network of interfaces.

In the instant invention, the various chemical constituents are in intimate contact with one another as particles with at least one coating. In contrast to dispersing particles as a second phase through a mixing or precipitation process, the instant process forms a second phase more homogeneously dispersed in a matrix, resulting in a very homogeneous material on the nanometer scale after coated-particle consolidation. This represents the ultimate in dispersion and produces a material with an extremely high interfacial area between the discrete constituents. Since the coated nanoparticles are consolidated, the intimate contact and small dimensions of the materials forms a practically continuous interface and allows for very rapid interaction of the materials. This results in a unique class of materials that is able to take advantage of any synergism of the two materials, such as self-healing.

The coated nanoparticle approach of the present invention is very different from the macroscopic layered approach of the prior art. The instant approach can effectively replace materials of the prior art in many different fields. Thus, the materials of this invention have broad application in a variety of different forms and may have a broad range of different compositions that depend on the specific application.

As a result, for the purposes of this invention, ICM will be used to reference coated nanoparticle materials consolidated to near theoretical density used in the various examples of the instant invention. In addition, the terms nano, nanoscopic, nanophase, nanoscale, nanosize, nanograined, and nanostructured will be used interchangeably.

The issue of thermodynamic stability of these nanostructures has also been addressed, evaluated, and managed. That is, since the interfacial surface area of these structures is huge, from a naive point of view it might be assumed that these structures are unstable. To eliminate any potential instability, selection of the material components is based on respective high-temperature stability and absence of any eutectics in the phase diagrams. In addition, the solid-state solubility is controlled by pre-selecting the phases so as to satisfy phase stability and co-existence rules of the thermodynamic phase diagrams that are known for the system. Moreover, it should be noted that the artificially produced coated nanoparticle structures of the instant invention have a lot in common thermodynamically with spinodal structures found in nature. That is, spinodal structures have similar nanostructural features and remarkable phase stability at high temperature. From this discussion, it should be clear that not all attractive material combinations could be used as particle substrates and coatings because of the thermodynamic stability requirement. The exact combination of the materials has to be deduced from corresponding phase diagrams to assure that the phases are stable at the temperatures required for service.

In fact, these artificially made nanostructures, if properly designed, should inherit a lot of stability features of spinodal structures, including, thermal stability, chemical stability, and mechanical stability. It is known that spinodal structures greatly resist any kind of thermo-chemical changes because, at any given temperature, the spinodal structures are at equilibrium and thus stable. Spinodal structures are also highly resistant to crack nucleation and growth because, as is true for all layered structures, the spinodal structures are susceptible to crack branching and crack-tip blunting. Accordingly, the consolidated coated nanoparticle materials that are the subject of this invention are also expected to have significantly increased fracture toughness, as represented in increased resistance to crack nucleation and crack propagation. All of this should lead to greatly improved mechanical strength, flaw tolerance, and thermal shock resistance.

In contrast to the designed interfaces of the present invention, the interfaces in conventional materials are grain boundaries between misaligned small crystals of the same phase material. In the nano-structured materials produced via this invention, every interface between the materials of the instant invention is an interface between dissimilar materials. The number of these interfaces per unit volume in the ICM is determined by the ratio of the particle size to particle coating thickness. By controlling these parameters, properties, such as the thermal conductivity, can be reduced by three orders of magnitude as compared to the best thermal insulators currently in use. Other advantages of the instant invention over a micro- or nano-layered approach include the ease and cost of production since all of the layers on the particles are put down simultaneously with low-cost techniques that do not require high vacuum. This is in contrast to the state-of-the-art nano-layered approach, which requires high vacuum, ultra clean equipment (such as magnetron sputtering or atomic layer deposition) to sequentially deposit nanometer layers of precise thickness, composition, and structure, one atom at a time. These are high cost techniques because of the time required for the sequential layer deposition at microns/hour as well as the cost of the large high vacuum systems. The cost of this sequential deposition and large high vacuum systems, as well as the difficulty of obtaining uniformly thin coatings over large areas (greater than 0.1 $m^2$ and preferably greater than 1 $m^2$) with complex geometry, limits the current processes to small parts with simple geometries. In addition, it should be noted that magnetron sputtering cannot coat nanoparticles evenly, and ALD is currently limited to oxides and a few elements.

There are no such limitations in the instant invention. The properties of the layered structures produced by the instant invention are isotropic, which is in contrast to the anisotropic properties of the sequential layered approach. This means that the material of this invention can be effective in any orientation while materials produced by the sequential layered approach must be used in a precise orientation to be effective. A final advantage of the instant invention over the sequential layered approach is that each particle is encapsulated by at least one coating. This will limit grain growth of the nanoparticles; in the sequential layered approach, grain growth is free to occur within each discrete layer.

The thermal shock resistance of the material fabricated by consolidating the coated nanophase particles should be much improved over that of the prior art. This results from the fact that, in state-of-the-art approaches, it is extremely difficult to match the thermal expansion coefficients and thermal conductivities between the coating and the substrate. In practice, these parameters are never matched, and this leads to severe thermal stresses when a coated part is rapidly heated or cooled. The severe thermal stresses always lead to the formation of cracks in the coating with the subsequent catastrophic failure. No such problems exist for the consolidated nanophase material of the instant invention because the consolidated nanophase material has an extremely homogeneous nanostructure, and thus no stresses due to thermal mismatch would be possible. The thermal conductivity of the coating material can be engineered to approach that of the nanoparticle material by optimizing the thickness of the coating around each grain.

What has been described thus far is one preferred embodiment of this invention, wherein particles of the same composition are coated with at least one coating of a composition that is different from the composition of the particle (usually the same for each particle in a component). There are numerous other ways to utilize consolidated, coated nanophase particles. In other preferred embodiments, the compositions of the particle or the coating(s) can be varied in a single application. Thus, an ICM may consist of more than one type of coated nanophase particle. That is, the particle composition can be varied while keeping the same coating material, the coating composition can be varied on different particles with the same composition, or the composition of the at least two types of coated particles can be totally different with different particles coated with different coatings. In each of these embodiments, particles can be coated with as many coatings as needed for the application. The composition of each particle coating layer is determined by the application and thermodynamic compatibility.

Example 1

Solid Electrolytes with Improved Conduction

The use of consolidated coated-nanoparticles is a very good approach to generate a whole family of Fast Ion Conducting materials that will possess large increases in ion conductivity and can be used as solid electrolytes in gas electrolyzers, electrochemical pumps, gas sensors, catalytic reactors, and, most importantly, in fuel cells. Production of energy from fuel cells utilizing ethanol, methanol, natural gas, coal products, etc. is of great national importance for use in transportation, stand-alone power, and residential power, to name a few. Although this technology has broad application, such as in cation-conductors (lithium and sodium solid electrolytes), we will take, as an example, oxygen ion conduction, for which the most commonly utilized solid electrolyte is yittria stabilized zirconia (YSZ). Although YSZ is the workhorse of the oxygen fuel cell industry, the low oxygen conductivity at temperatures below 800° C. is a major problem causing huge inefficiencies due to the thermal losses and material degradation. Lowering the operational temperature, even by 100° C., would give a big boost to this industry.

It should be noted that there are a few experimental materials with better oxygen conductivity than YSZ, such as Gadolinia-doped Ceria and Lanthanum Gallates. However, these alternatives are not used because of thermal instability, electronic contribution to conductivity, poisoning effects of sulfur, etc.

In current oxygen fuel cells, YSZ is used in the shape of a cylinder with two streams of different gases, one along the interior and the other at the exterior of the cylinder. Normally, fuel, in the form of gasified coal or natural gas, is blown on the inside of the cylinder, and an oxidizer, such as air, or pure oxygen, is blown on the outside. The rate of movement of oxygen ions from the outside to the inside of this solid electrolyte cylinder depends on the conductivity of the material and is the key parameter for the efficiency and power output of such a fuel cell. YSZ has an oxygen conductivity of 0.1 S/cm at 1000° C. The smallest value of conductivity acceptable for operation of the fuel cell is ten times lower, i.e., 0.01 S/cm. Thus, if a lower-temperature oxygen conductor is to find industrial applications, then its conductivity must be at least 0.01 S/cm.

The instant invention provides a novel approach and methodology for fabricating such a material: a solid electrolyte with oxygen conductivity greatly superior to that of YSZ, potentially exceeding room temperature (RT) conductivity of YSZ by 8 orders of magnitude. After optimization of processing, the novel material of this invention can have RT oxygen conductivity near 0.01 S/cm, which would make possible industrial development of room temperature oxygen fuel cell (if appropriate low temperature catalysts become available). This invention also provides a novel approach to fabricate a cylinder from the material of choice in a simple and industrially scalable manner.

The background art for this invention is the fundamental discovery of Colossal Ionic Conductivity in Zirconia, stabilized with 8% yttria, layered with strontium titanate and possessing coherent interfaces, as provided in J. GARCIA-BARRIOCANAL et al., "Colossal Ionic Conductivity at Interfaces of Epitaxial $ZrO_2$:$Y_2O_3$/$SrTiO_3$ Heterostructures," Science. Vol. 321 (2008) 676-680. In this fundamental work, the layered sample was made via Atomic Templating utilizing magnetron sputtering. The samples consisted of a multitude of parallel, extremely fine alternating layers, 1-62 nm thick (YSZ) and 10 nm thick for $SrTiO_3$ (STO). Because of the extremely fine features of these layers, the interfaces between the different layers acquire remarkably high oxygen-ion mobility. In GARCIA-BARRIOCANAL et al., the oxygen conductivity along the $ZrO_2$:$Y_2O_3$/$SrTiO_3$ interfaces were found to be nearly 8 orders of magnitude greater than that of YSZ, at 84° C. when the thickness of the YSZ layers was 1 nm. However, even when the thickness of the YSZ layers was as large as 62 nm, the conductivity of the samples was still 3 orders of magnitude higher than that of YSZ. This groundbreaking result was attributed by the investigators to the coherent nature of the atomic interfaces that formed between the two phases during magnetron sputtering. These coherent interfaces, according to the authors, contained large numbers of vacancies and low-activation barrier sites for oxygen ions, thus creating a high-mobility environment for oxygen ions to move.

Although not stated by the authors, one plausible explanation for the $10^8$ enhancement in ionic mobility is that oxygen ions create a lattice gas structure in the thin film-like region of the interface. The lattice gas is best described by the Ising model. The phenomenal mobility arises because oxygen ions create a perfectly ordered super lattice, albeit with some defects. These defects move with phenomenal ease, because they assist each other and have very low activation energy of hopping. Thus, it follows that the thin interfacial film-like region must be atomically perfect—otherwise the effect disappears.

As stated above, to achieve these breakthrough results, GARCIA-BARRIOCANAL et al. had to use magnetron sputtering in a high vacuum chamber to grow the epitaxial heterostructures. The huge drawback of this technology for industrial applications is that the deposition rate in a magnetron is very slow (on the order of nm/min) and only relatively small samples (less than 1 sq. ft.) can be produced. This makes the technique inherently very expensive and cumbersome to use for fabricating shapes other than extremely thin films. Making the cylindrical shape needed for fuel cell applications is not feasible with the magnetron technology. Thus, any industrial applications of this remarkable scientific breakthrough are impossible as long as magnetron sputtering is utilized for making the material. In contrast, the novel approach of the current invention utilizes highly industrially scalable methods and materials, yielding similar results in regards to conductivity.

In contrast to the magnetron layered approach, the ICM approach utilizes coated nano-particles of the relevant material pair. Thus, a semi-coherent or, preferably, a coherent interface is formed between the coating and each nano-particle. If the coating on each particle is thin enough and the coated particles are consolidated well to one another, then there will essentially be a continuous coherent interface through the sample. In this example the particle can be either 8% YSZ or strontium titanate with the coating being the other material. However, the preferred embodiment is to utilize a strontium titanate particle coated with a thin layer of YSZ.

In addition to the fact that the thin interfacial film must be atomically perfect, the interfacial film must not be thicker than some critical thickness, which is possibly about 5 nm. Above this thickness value, the benefits would disappear in the coated nanoparticle samples because the "magical" interface exists only around the individual nanoparticle or grain. To move from one nanograin to another, an ion must travel in a direction that is perpendicular to the two-dimensional interface. Such transitions can only be possible for the hopping oxygen ions if the interfacial film-like region is just a few atomic layers thick—otherwise the ionic motions are blocked. The extreme fineness of the interface is crucial for the capability of an oxygen ion to transition from one grain to another, which is essential for high DC conductivity.

In one embodiment, the particles are formed and then coated by techniques previously discussed. The formed and coated particles are compacted, and then the greenware is consolidated under high pressure (greater than 0.3 GPa and preferably greater than 1.0 GPa) at the lowest possible temperature with as short holding times (measured in minutes and preferably seconds) as possible to produce semi-coherent interfaces without grain growth. The required times, pressures, and temperatures vary with the material to be consolidated. This is preferably performed with dynamic consolidation techniques, such as, rapid pre-heating, in situ heating, adiabatic effects of compaction, microwaves, or electric currents to achieve elevated temperatures. It should be noted that the method is also possible with techniques, such as microwave heating, operable to sinter a sample in minutes or seconds without the use of elevated pressure. To obtain the highest-quality interfaces, processing is optimized by varying pressure, time, temperature, and post-anneal combination until the best ionic mobility (due to the improved coherency and continuity of the interfaces) is obtained. Conventional high-temperature sintering can definitely not be employed since it would destroy the engineered interfaces, either by dissolving the interfaces or as a result of grain growth.

In a preferred embodiment, Atomic Templating via Cold Compaction is employed. In this process, the un-agglomerated nano-sized particles of STO (less than 50 nm and preferably mono-sized spheres having a diameter that is less than 11 nm) are formed and then coated with an extremely thin layer (less than 5 nm and preferably less than 1 nm) of YSZ by techniques previously discussed (preferably by sol gel techniques). Prior to densification, the powder consisting of the nano-coated nano-particles should be compacted (usually by compression) into a green compact having a density near the highest density for compacted spheres, which is about 64% of the theoretical density of the materials comprising the spheres for random packing of spheres or up to 74% for FCC packing—the highest achievable density for packing of monosize spheres. This task can be achieved by a variety of compaction processes that are well-known to those skillful in the art of powder compaction.

The more ordered packing can be achieved by using proper lubricants to coat the surface of the compacting particles and applying pressure to the compact at a carefully selected, predetermined rate to allow for particle re-arrangement and re-stacking via sliding of particles past each other. The process can also be greatly assisted by applying ultrasonic agitation to the compact during the compaction procedure.

A variety of gasses can be used to assist the compaction process, as has been shown in CHEN et al., "Novel Equipment for the Study of Compaction of Fine Powders," Journal of the American Ceramic Society, Vol. 77 (1994) 1005-1010. For example, nitrogen at cryogenic temperatures (77 K) can be a potent lubricant for nanosize particles and can be easily removed after the compaction step.

After cold compaction of the powder, the obtained green compact must be de-gassed to remove the lubricant and any other gaseous substances still attached to the surface of the particles. This is done by an outgassing step, which consists of calcining the green compact under vacuum at temperatures ranging from 100° C. and 400° C. for 24 hours. The prolonged time of calcinations is required due to the fact that the spaces between nanosize particles are extremely small in size, below 1 nm, which makes the process of degassing very slow.

The next step of the procedure is densification of the green compact using rapid-rate dynamic consolidation methods at temperatures low enough to prevent grain-growth phenomena that could lead to destruction of the continuity of the interfaces. To prevent the grains from growing and the coating from coarsening and pulling away from the substrate, low-temperature (i.e., less than 0.5 of the melting temperature)—high-pressure (greater than 0.3 GPa and preferably greater than 1.0 GPa) densification of the green compacts can be utilized. There are a number of such techniques that can be used to achieve this goal, including, for example, Rapid Omnidirectional Compaction and in-situ heating. All of these methodologies accomplish similar goals of rapidly consolidating the green compact at temperatures below 1000° C., using pressures of 1-5 GPa.

At these high pressures, the mechanism of consolidation of the material is fundamentally different from that of pressureless sintering. The material densities via plastic flow rather than diffusion-assisted and viscous flow that is characteristic of high-temperature sintering. Because the highly-conductive interfaces quickly dissolve at temperatures that are required for the diffusion and viscous flow, high-temperature sintering should not be used for fabricating dense nanostructured fast ion conductors.

After this stage, the density of the consolidated part should be above 95% of the full density of the material. As the particles deform and consolidate into the dense composite, a continuous network of YSZ/STO interfaces is formed. These interfaces are the sites for the rapid oxygen ion mobility. However, the coherency after the dynamic consolidation can be significantly improved by post-consolidation heat treatment.

After dynamic consolidation, the material is post-heat treated to develop essentially perfect atomic coherence of the atomic interfaces without causing any grain-growth phenomena. The perfect coherency between YSZ and STO atomic lattices is essential for the colossal ionic conductivity observed in the fundamental work of GARCIA-BARRIOCANAL et al., which is cited above. The cubic fluorite lattice of Y—$ZrO_2$ growth is rotated 45° to c-axis of the perovskite structure of STO. The lattice constant of STO is 0.3905 nm and that of YSZ is 0.514 nm. As YSZ is rotated, it has to stretch, since $0.514/2^{1/2}=0.364$ nm is 7% too short to fit onto the 0.3905 nm lattice. This 7% strain leads to a weakening of the bonds between ions, which lowers the activation energy of the ionic jump and greatly increases ionic mobility. Also, a large number of oxygen vacancies are generated at the interface. All of this illustrates the point that the interface must be coherent and atomically perfect. Just putting YSZ next to STO will not do the trick—the atomic rearrangement must take place and the coherent atomic planes must extend from one phase to another.

This latest step accomplishes this requirement of coherency. After the dynamic consolidation, the interfaces are highly strained and cold-worked. Large numbers of dislocations present as non-equilibrium high-energy structures. A mild anneal at slightly elevated temperature (200° C. to 400° C.) allows for atomic re-arrangement to re-construct the atomically coherent interfaces, which are thermodynamically stable at low temperatures. These mild anneal temperatures are too low to produce grain growth.

Although not the preferred approach and not as effective, another method that is more straight forward and less expensive than coating nanoparticles may be employed. This method may include selecting un-agglomerated nano-sized particles (less than 10 nm and preferably less than 5 nm) of the appropriate materials (strontium titanate and 8% yttria stabilized zirconia in this example). These particles are intimately mixed (for example, by techniques such as forming sol gel particles of YSZ and STO together, forming the particles separately and subsequently mixing, or by milling (either together or separately) and mixing YSZ and STO together). The compaction, consolidation, and annealing of these particles can then follow either of the previous examples.

The three approaches described seem to be the only meaningful ones from an industrial point of view to make low-cost bulk materials with well-designed nano-structured continuous interfaces. In addition, it should be noted that an additional advantage of these approaches is that the enhanced ionic conductivity is isotropic in contrast to the sample fabricated by the magnetron sputtering approach, which it is anisotropic and conducts only along the interfaces between layers of the materials. Obviously, these three approaches are applicable to numerous other fast ion conducting materials.

Example 2

Novel Semiconductor Materials

Novel semiconducting materials that will play a major role in several new technologies such as nonlinear optics, luminescence, electronics, catalysis, solar energy conversion, and optoelectronics are amendable to manufacture using the instant invention. It is well-known that the small dimensions of nanosize particles of semiconductors, such as CdS and CdSe, for example, result in physical properties that are different from those observed in bulk material. However, manufacturing bulk pieces from these materials is complicated. The instant approach, however, is naturally amenable to manufacturing large samples. At the start, the semiconducting particles are capped with an organic material, such as thiophenol, which allows for pressure-assisted consolidation and nano-assembly. The interfaces can be designed to generate specific energy levels for electrons or holes or even to act as donor/acceptor regions where electrons or holes are created or absorbed. Thus, the material of the grains acts as an intrinsic semiconductor, whereas the boundaries of the nanocrystals act as an extrinsic semiconductor, of either n- or p-type, or to just provide additional energy levels.

Currently, the only approach for fabricating such a material is via nano-assembly, which is greatly limited in the type of materials that can be used for capping nanoparticles and is not nearly as flexible as the method of this invention.

Example 3

Novel Magnetic Materials

In regards to novel magnetic materials, the ICM approach is ideal for manufacturing bulk quantities of superior magnetic materials. This approach, by the virtue of protecting the size of starting nanoparticles and assuring that each particle is protected with a cap of designed interfacial material, is the ideal method for manufacturing magnetic materials of low cost and extremely high coercivity.

It is well-known that nanoparticles of magnetic materials show unusual and highly desirable magnetic behaviors when compared to the bulk materials due to interface effects, such as symmetry breaking, electronic environment/charge transfer, and magnetic interactions and as described in A. E. BERKOWITZ et al., "Establishing exchange bias below $T_N$ with polycrystalline $Ni_{0.52}Co_{0.48}$O/Co bilayers," Phys. Rev. B, Vol. 72 (2005) 134428. For example, nearly spherical and magnetically hard Fe, Co, and Fe(Co)—B-based particles in the size range of 7-20 nm possess an effective anisotropy and coercivity that is one to two orders of magnitude higher than in the bulk materials. [see, Z. SHUFENG et al., "Coercivity Induced by Random-Field at Ferromagnetic and Antiferromagnetic Interfaces," J. Mag. Mag. Mater., Vol. 468 (1999) 198-199.] The highest coercivities are obtained in capped particles that have a core/shell morphology comprising a metallic core surrounded by a $Fe_2O_3/Fe_3O_4$ (or berthollide) oxide shell consisting of small grains, which is exactly the technology of ICM. Theoretically, the large coercivities have been attributed to an exchange interaction between the core and shell moments at the interface, which can be easily modified and controlled by the ICM processing approach.

The surface/interface effects, as well as the intra- and inter-particle interactions on the magnetic properties of nanoparticles of rare earth metals and inter-metallic compounds with high anisotropy, are expected to be of great importance to magnetic recording media. This drive for higher density media requires isolated particles with size dimensions below 10 nm and coercivity greater than 3 kOe. Transition metals and their alloys have a low anisotropy and become superparamagnetic below this size. It is thought that by controlling the magnetic properties of the interfacial regions (increasing the exchange interaction via incorporating magnetic oxides of Co), very useful magnetic materials for future magnetic recording can be produced.

Example 4

Magnetostrictive Materials

The magnetostrictive phenomenon refers to the deformation of a material in a magnetic field. Advanced magnetostrictive materials have possessed great technological importance for many years. In 1975, the discovery of new magnetostrictive materials, for example, Terfenoi-D ($Tb_{0.3}Dy_{0.7}Fe_2$), having enhanced performance and interesting physics renewed interest in magnetostriction.

In all applications, the system efficiency depends critically on the relative change in length (I=Dl/l) as a function of the applied field. Values of Dl/l on the order of $200 \times 10^{-6}$ with a field smaller than 200 Oe are desired [see, R. C. O'HANDLEY et al., "Phenomenology of Giant Magnetic-Field induced Strain in Ferromagnetic Shape Memory Materials," J. Appl. Phys., Vol. 87 (2000) 4712]. However, this is not possible with existing materials, which require saturation fields of tens of kOe. Nanostructured materials are potential candidates that can lead to the desired properties through atomic engineering. Such properties can be obtained in amorphous or nanocrystalline alloys with reduced anisotropy and in multilayers with alternating stacks of high magnetostrictive materials and soft magnetic materials that are exchange coupled. With the instant invention, samples with giant magnetostriction can be prepared. Some preliminary results on amorphous $Tb_{33}Fe_{67}/Fe_{80}B_{20}$ multilayers, reported in R. C. O'HANDLEY et al., supra, are clearly promising with high transverse magnetostriction of $600 \times 10^{-6}$ obtained in field around 2 kOe.

Example 5

Hydrogen Storage Materials

The ICM approach outline above is ideally suitable for fabricating materials for hydrogen storage at ambient pressure and temperature. For this application, the capability of the ICMs approach to fabricate mesoporous nanostructures in a highly controlled manner and hierarchically-ordered nanostructures is a key advantage.

Hydrogen storage materials, by definition, must have an extremely high interfacial area to physisorb, chemisorb, or simply absorb hydrogen molecules. Also, the ideal material must have extremely well-dispersed and interconnected porosity, in a way similar to the structure of human lungs. For the rapid, controllable release of hydrogen gas, the nanopores containing hydrogen must be connected to larger pores and larger channels to allow for pressure control.

The ICM approach and the interface defined nano-laminate approach described in a pending application can be combined to produce such extremely complex hierarchical structures. Moreover, the chemistry of the interface that would accept the hydrogen material and the host material that would physisorb it can be easily varied to achieve the optimum properties. For this application, the preferred starting materials are LiH and other hydrides that have been shown to have high affinity to hydrogen. Also, activated carbon nanotubes, and various sub-stoichiometric carbides capped with catalytic and protective metals and organics are ideally amenable for this approach.

Example 6

Relaxor Dielectrics

Relaxor dielectrics with enormous dielectric constants can also be fabricated utilizing the ICM approach.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. A process of synthesizing an isotropic nano-material having at least one property controlled by interfaces within the nano-material, the process comprising:
   selecting a first plurality of nanoparticles comprising yttria stabilized zirconia;
   selecting a second plurality of nanoparticles comprising strontium titanate such that nanoparticles of the second plurality have a composition that is different from a composition of nanoparticles of the first plurality;
   homogeneously mixing the first and second pluralities of nanoparticles to form a mixture having nanoparticles of the first plurality surrounded by nanoparticles of the second plurality and nanoparticles of the second plurality surrounded by nanoparticles of the first plurality;
   compacting the mixture;
   consolidating the compacted mixture to form a first interface between nanoparticles of the first and second pluralities by setting a temperature to less than about 0.5 of the melting temperatures of the compacted mixture and a pressure to greater than about 0.3 GPa so as to induce a plastic deformation process while limiting diffusion-assisted flow processes in forming the first interface; and
   annealing the compacted and consolidated mixture at a temperature ranging from 200° C. to 400° C. such that atoms on surfaces of nanoparticles of the first and second pluralities undergo rearrangement and the first interface is converted to a second interface, the second interface being continuous, coherent, and stable.

2. The process of claim 1, wherein consolidating the compacted mixture includes pressing, spraying, rapid sintering, microwave heating, or atomic templating.

3. The process of claim 1, wherein the pressure while consolidating the compacted mixture is greater than about 1.0 GPa.

4. The process of claim 1, wherein consolidating the compacted mixture further comprises:
   applying a magnetic field or an electric field to the compacted mixture.

5. The process of claim 1, wherein compacting the mixture includes an adiabatic compaction process.

6. The process of claim 1, wherein consolidating the compact mixture includes in situ heating, rapid omni-directional compaction, elevated temperature compaction, or explosive compaction.

7. The process of claim 1, wherein nanoparticles of the first and second pluralities have a size dimension ranging from 1 nm to 100 nm.

8. The process of claim 1, wherein nanoparticles of the first plurality of a size dimension that is greater than a size dimension of nanoparticles of the second plurality.

9. The process of claim 8, wherein nanoparticles of the second plurality are configured to form a coating over nanoparticles of the first plurality.

10. The process of claim 8, wherein the nanoparticles of the first and second pluralities are spherical and the size dimension is a diameter.

11. The process of claim 1, wherein homogenously mixing includes milling, grinding, attriting, a vapor phase deposition process, a supercritical fluid process, or sol gel process.

12. The process of claim 1, further comprising:
   adding a lubricant, ultrasonic agitation, or a gas to assist compacting the mixture; and
   removing the lubricant, ultrasonic agitation, or the gas before consolidating the compact mixture.

13. The process of claim 1, wherein the isotropic nano-material has a density of at least 95% of theoretical density.

14. A process of synthesizing an isotropic nano-material having at least one property controlled by interfaces within the nano-material, the process comprising:
   homogeneously mixing yttria stabilized zirconia nanoparticles and strontium titanate nanoparticles to form a mixture having yttria stabilized zirconia nanoparticles surrounded by strontium titanate nanoparticles and strontium titanate nanoparticles surrounded by yttria stabilized zirconia nanoparticles;
   compacting the mixture;
   consolidating the compacted mixture by a densification process having a temperature less than about 0.5 of the melting temperature of the compacted mixture and a pressure greater than about 0.3 GPa so as to form to form a first interface between the yttria stabilized zirconia nanoparticles and the strontium titanate nanoparticles by inducing a plastic deformation process while limiting diffusion-assisted flow and grain growth processes; and
   annealing the compacted and consolidated mixture at a temperature ranging from 200° C. to 400° C. such that atoms adjacent to the first interface undergo rearrangement and the first interface is converted to a second interface, the second interface being continuous, coherent, and stable.

15. The process of claim 14, wherein consolidating the compacted mixture further comprises:
   applying a magnetic field or an electric field to the compacted mixture.

16. The process of claim 14, wherein compacting the mixture includes an adiabatic compaction process.

17. The process of claim 14, wherein consolidating the compact mixture includes in situ heating, rapid omni-directional compaction, elevated temperature compaction, or explosive compaction.

18. The process of claim 14, further comprising:
   adding a lubricant, ultrasonic agitation, or a gas to assist compacting the mixture; and
   removing the lubricant, ultrasonic agitation, or the gas before consolidating the compact mixture.

19. The process of claim 1, wherein a maximum size dimension of nanoparticles of the first plurality is approximately equal to a maximum size dimension of nanoparticles of the second plurality to maximize homogenous mixing.

20. A process of synthesizing an isotropic nano-material having at least one property controlled by interfaces within the nano-material, the process comprising:
   selecting nanoparticles comprising of yttria stabilized zirconia;
   selecting a coating material having a desired property, the coating material comprising strontium titanate;

coating or capping each of the nanoparticles with the coating material;

compacting the coated nanoparticles;

consolidating the compacted and coated nanoparticles by a densification process having a pressure greater than about 0.3 GPa and a temperature less than about 0.5 of the melting temperature of the coated nanoparticles so as to form a first interface between the yttria stabilized zirconia and the strontium titanate by inducing a plastic deformation process while limiting diffusion-assisted flow and grain growth processes; and annealing the compacted, consolidated, and coated nanoparticles at a temperature ranging from about 200° C. to about 400° C. such that atoms adjacent the first interface undergo rearrangement to a second interface, wherein the second interface is continuous, coherent, and stable.

21. The process of claim 8, wherein nanoparticles of the first plurality are configured to form a coating over nanoparticles of the second plurality.

* * * * *